(12) United States Patent
Lin et al.

(10) Patent No.: US 12,556,277 B2
(45) Date of Patent: Feb. 17, 2026

(54) OPTICAL FIBER NETWORK DEVICE AND OPTICAL FIBER OPTIC SIGNAL TRANSMISSION METHOD

(71) Applicant: AuthenX Inc., Hsinchu County (TW)

(72) Inventors: Sheng-Fu Lin, Hsinchu County (TW); Po-Kuan Shen, Hsinchu County (TW); Chun-Chiang Yen, Hsinchu County (TW); Yi-Ting Lu, Hsinchu County (TW); Jun-Rong Chen, Hsinchu County (TW); Jenq-Yang Chang, Hsinchu County (TW); Mao-Jen Wu, Hsinchu County (TW)

(73) Assignee: AuthenX Inc., Hsinchu County (TW)

( * ) Notice: Subject to any disclaimer, the term of this patent is extended or adjusted under 35 U.S.C. 154(b) by 221 days.

(21) Appl. No.: 18/467,308

(22) Filed: Sep. 14, 2023

(65) Prior Publication Data

US 2024/0089000 A1    Mar. 14, 2024

Related U.S. Application Data

(63) Continuation-in-part of application No. 18/304,375, filed on Apr. 21, 2023.

(60) Provisional application No. 63/406,669, filed on Sep. 14, 2022.

(51) Int. Cl.
*H04B 10/25* (2013.01)
*G02B 6/42* (2006.01)
*H04J 14/02* (2006.01)

(52) U.S. Cl.
CPC .......... *H04B 10/25* (2013.01); *G02B 6/4246* (2013.01); *H04J 14/02* (2013.01)

(58) Field of Classification Search
CPC .. H04B 10/25; H04B 10/25752; H04B 10/40; H04B 10/43; H04B 10/2589; H04B 10/506; G02B 6/4246; G02B 6/12007; H04J 14/02; H04J 14/0307
See application file for complete search history.

(56) References Cited

U.S. PATENT DOCUMENTS

| | | | |
|---|---|---|---|
| 11,313,682 B1* | 4/2022 | Hung | G01C 19/725 |
| 2010/0119229 A1 | 5/2010 | Roelkens et al. | |
| 2010/0178053 A1* | 7/2010 | Sagawa | H04B 10/272 |
| | | | 398/67 |

(Continued)

*Primary Examiner* — Hibret A Woldekidan (57) ABSTRACT

An optical fiber network device includes a fiber and a photonic integrated circuit. Fiber receives a first optical signal and transmits a second optical signal. A first wavelength of first optical signal is different from a second wavelength of second optical signal. Photonic integrated circuit includes a laser chip, a photodetector, a wavelength division multiplexing coupler, a first optical modulation element and a second optical modulation element. Laser chip is disposed on photonic integrated circuit, and is configured to generate first optical signal. Photodetector detects second optical signal. Wavelength division multiplexing coupler is configured to couple first optical signal to fiber, and receives second optical signal. First optical modulation element is coupled to wavelength division multiplexing coupler and laser chip, and is configured to modulate first optical signal. Second optical modulation element is coupled to wavelength division multiplexing coupler and photodetector, and is configured to modulate second optical signal.

20 Claims, 11 Drawing Sheets

(56) References Cited

U.S. PATENT DOCUMENTS

2012/0251122 A1* 10/2012 Grobe .............. H04J 14/02764
  398/79
2016/0047990 A1  2/2016 Zine-El-Abidine
2022/0405566 A1  12/2022 Winterbottom et al.

* cited by examiner

OPTICAL FIBER NETWORK DEVICE AND OPTICAL FIBER OPTIC SIGNAL TRANSMISSION METHOD

CROSS-REFERENCE TO RELATED APPLICATION

This application is a Continuation-in-part of U.S. application Ser. No. 18/304,375, filed on Apr. 21, 2023, which claims priority of U.S. Provisional Application Ser. No. 63/406,669, filed on Sep. 14, 2022, the entirety of which is incorporated by reference herein in their entireties.

BACKGROUND

Field of Invention

The present disclosure relates to a communication device and a method. More particularly, the present disclosure relates to an optical fiber network device and an optical fiber optic signal transmission method.

Description of Related Art

A laser chip of conventional optical fiber network device is configured to output an optical signal to a fiber for transmission. Compared with ordinary light, a laser beam has good directivity. However, when a laser beam propagates, it gradually diffuses as a distance increase, and an output terminal of a laser chip must be aligned with a transceiver port of a fiber for fixing, so that a laser beam can accurately be emitted into the transceiver port of the fiber. An alignment process accounts for most of manufacturing cost and time cost of optical fiber network devices.

In addition, if an output terminal of a laser chip is not aligned with a transceiver port of a fiber, a coupling and transmission efficiency of an optical fiber network device will be poor.

For the foregoing reason, there is a need to provide a suitable optical fiber network device to solve the problems of the prior art.

SUMMARY

One aspect of the present disclosure provides an optical fiber network device. The optical fiber network device includes a fiber and a photonic integrated circuit. The fiber is configured to receive a first optical signal and transmit a second optical signal. A first wavelength of the first optical signal is different from a second wavelength of the second optical signal. The photonic integrated circuit is configured to transmit the first optical signal and receive the second optical signal. The photonic integrated circuit includes a laser chip, a photodetector, a wavelength division multiplexing coupler, at least one first optical modulation element and at least one second optical modulation element. The laser chip is disposed on the photonic integrated circuit, and is configured to generate the first optical signal. The photodetector is configured to detect the second optical signal. The wavelength division multiplexing coupler is configured to couple the first optical signal to a transceiver port of the fiber, and receive the second optical signal from the transceiver port of the fiber. The at least one first optical modulation element coupled to the wavelength division multiplexing coupler and the laser chip, and is configured to modulate the first optical signal. The at least one second optical modulation element is coupled to the wavelength division multiplexing coupler and the photodetector, and is configured to modulate the second optical signal.

Another aspect of the present disclosure provides an optical fiber optic signal transmission method. The optical fiber optic signal transmission method is adapted to an optical fiber network device. The optical fiber network device includes a fiber and a photonic integrated circuit. The photonic integrated circuit includes a laser chip, a photodetector, a wavelength division multiplexing coupler, at least one first optical modulation element and at least one second optical modulation element. The at least one first optical modulation element is coupled to the wavelength division multiplexing coupler and the laser chip. The at least one second optical modulation element is coupled to the wavelength division multiplexing coupler and the photodetector. The optical fiber optic signal transmission method includes: generating a first optical signal by the laser chip; modulating the first optical signal by the at least one first optical modulation element; coupling the first optical signal to a transceiver port of the fiber by the wavelength division multiplexing coupler, and receiving a second optical signal from the transceiver port of the fiber by the wavelength division multiplexing coupler, which a first wavelength of the first optical signal is different from a second wavelength of the second optical signal; modulating the second optical signal by the at least one second optical modulation element; and detecting the second optical signal by the photodetector.

In view of the aforementioned shortcomings and deficiencies of the prior art, the present disclosure provides an optical fiber network device. Through a design of an optical fiber network device of the present disclosure, a manufacturing cost of an optical fiber network device can be reduced, and a coupling efficiency of an optical signal transmitted by an optical fiber network device can be improved.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
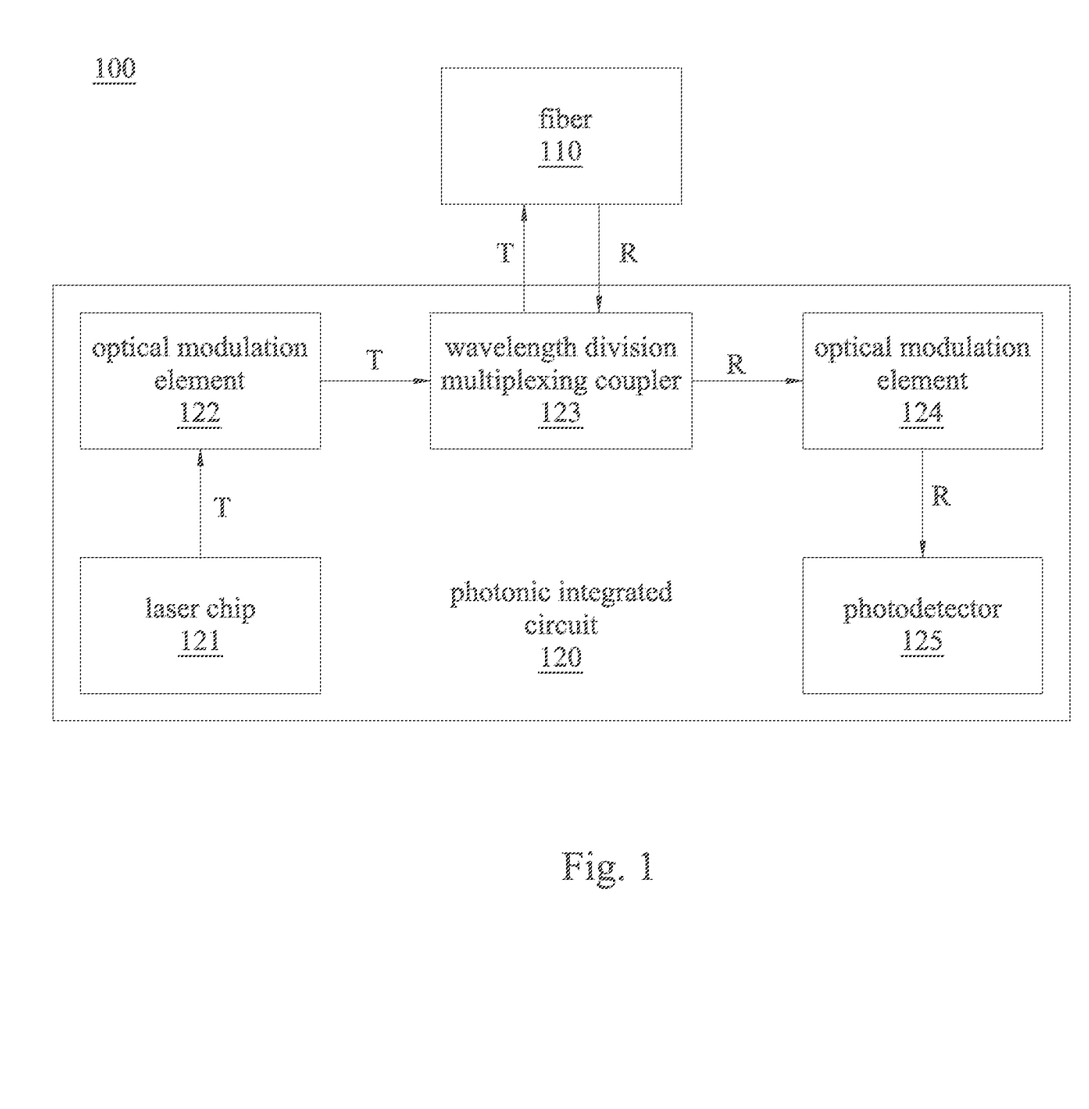
FIG. 1 depicts a schematic diagram of an optical fiber network device according to some embodiments of the present disclosure.

FIG. 1 depicts a schematic diagram of an optical fiber network device 100 according to some embodiments of the present disclosure. In some embodiments, as shown in FIG. 1, the optical fiber network device 100 includes a fiber 110 and a photonic integrated circuit 120. The fiber 110 is configured to receive a first optical signal T and transmit a second optical signal R. A first wavelength of the first optical signal T is different from a second wavelength of the second optical signal R. The photonic integrated circuit 120 is configured to transmit first optical signal T and receive the second optical signal R.

In some embodiments, the photonic integrated circuit 120 includes a laser chip 121, an optical modulation element 122, a wavelength division multiplexing coupler 123, an optical modulation element 124 and a photodetector 125. The laser chip 121 is disposed on the photonic integrated circuit 120. The optical modulation element 122 is coupled to the laser chip 121 and the wavelength division multiplexing coupler 123. The optical modulation element 124 is coupled to the wavelength division multiplexing coupler 123 and the photodetector 125.

In some embodiments, the laser chip 121 is configured to generate the first optical signal T. The optical modulation element 122 is configured to modulate the first optical signal T. The wavelength division multiplexing coupler 123 is configured to couple the first optical signal T to a transceiver port of the fiber 110 and receive the second optical signal R from the transceiver port of the fiber 110. The optical modulation element 124 is configured to modulate the second optical signal R. The photodetector 125 is configured to detect the second optical signal R.

In some embodiments, the optical modulation element 122 includes one of a spot size converter, a filter, a taper, a splitter, a modulator and a combiner or a combination of aforementioned elements.

In some embodiments, the optical modulation element 124 includes one of a spot size converter, a filter, a taper, a splitter, a modulator and a combiner or a combination of aforementioned elements.

It should be noted that the aforementioned spot size converter can be divided into three kinds of converters, for example, single-mode and multi-mode converters, optical fiber and waveguide mode converters, and waveguide and laser chip mode converters.

Figure 2A:
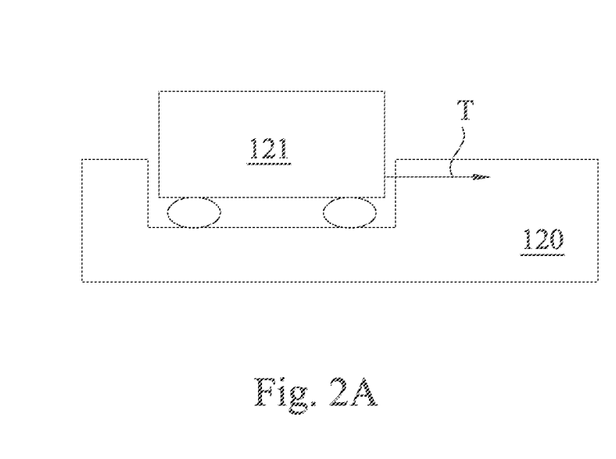
FIGS. 2A to 2C depict schematic diagrams of a laser chip of a photonic integrated circuit of an optical fiber network device according to some embodiments of the present disclosure.
Figure 2B:
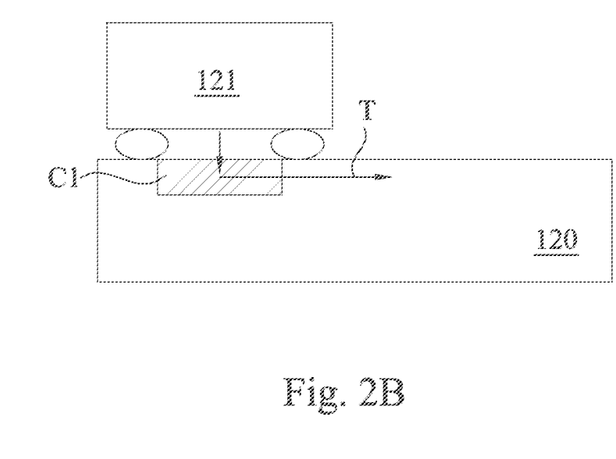
Figure 2C:
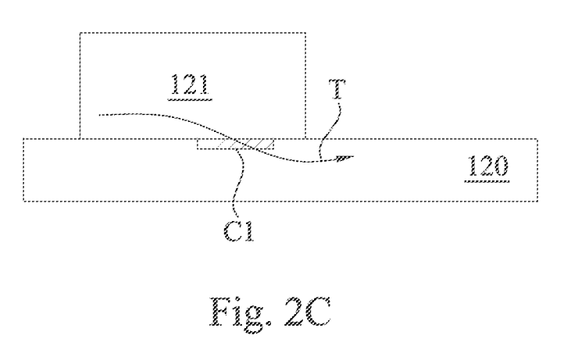

FIGS. 2A to 2C depict schematic diagrams of the laser chip 121 of the photonic integrated circuit 120 of the optical fiber network device 100 of FIG. 1 according to some embodiments of the present disclosure. FIGS. 2A and 2B show that the laser chip 121 is combined on the photonic integrated circuit 120. FIG. 2C shows that the laser chip 121 is integrated in the photonic integrated circuit 120.

In some embodiments, the laser chip 121 includes one of an edge-emitting laser chip and a surface-emitting laser chip.

In some embodiments, please refer to FIG. 2A, the laser chip 121 is the edge-emitting laser chip. An epitaxial plane of the edge-emitting laser chip is along a horizontal direction. After dicing, an optical reflective film is coated on the left and right sides of a crystal grain. A laser beam resonates back and forth along the horizontal direction. As shown in FIG. 2A, the first optical signal T is emitted from a right side of the laser chip 121 and directly enters the photonic integrated circuit 120. A laser power of the edge-emitting laser chip is high, but a projected laser beam is elliptical. Due to a large difference between a core size of an optical waveguide and a size of the projected laser beam, an energy loss of the projected laser beam is relatively large when the projected laser beam is projected to the photonic integrated circuit 120.

In some embodiments, please refer to FIG. 2B, the laser chip 121 is the surface-emitting laser chip. An epitaxial plane of the surface-emitting laser chip is stacked in a vertical direction. After dicing, A laser beam resonates back and forth along the vertical direction. As shown in FIG. 2B, the first optical signal T is emitted from a surface of the laser chip 121, and is emitted int the photonic integrated circuit 120. Furthermore, the laser beam is transmitted through a waveguide (not shown in the figure) of the photonic integrated circuit 120 by a coupler C1 (such as a coupling grating).

In some embodiments, please refer to FIG. 2C, regardless of whether the laser chip 121 is an edge-emitting laser chip or a surface-emitting laser chip. Since the laser chip 121 is integrated in the photonic integrated circuit 120, the first optical signal T generated by the laser chip 121 is transmitted to the photonic integrated circuit 120 through the coupler C1 along a curved light path as shown in FIG. 2C.

Figure 3A:
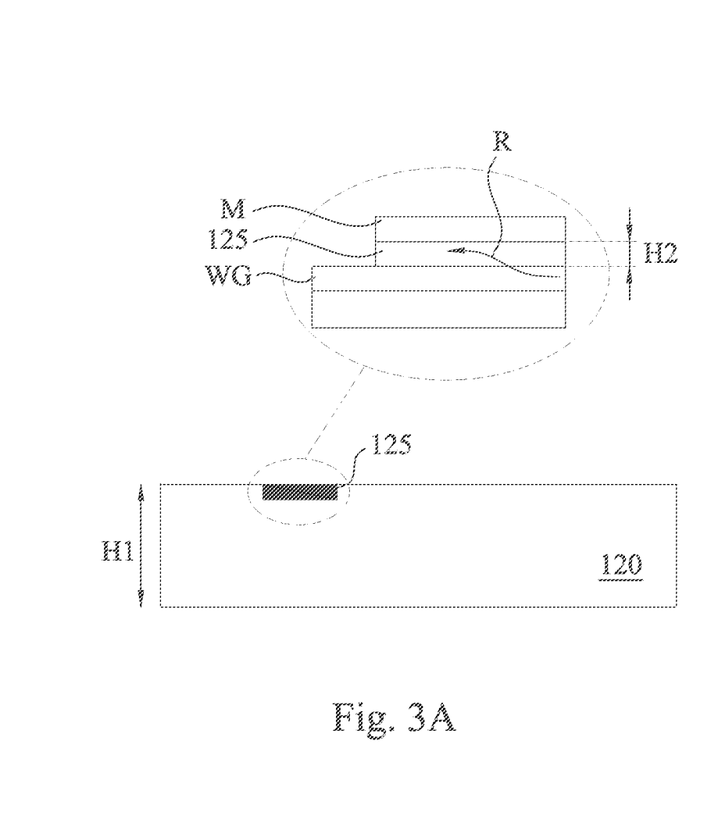
FIGS. 3A to 3B depict schematic diagrams of a photodetector of a photonic integrated circuit of an optical fiber network device according to some embodiments of the present disclosure.
Figure 3B:
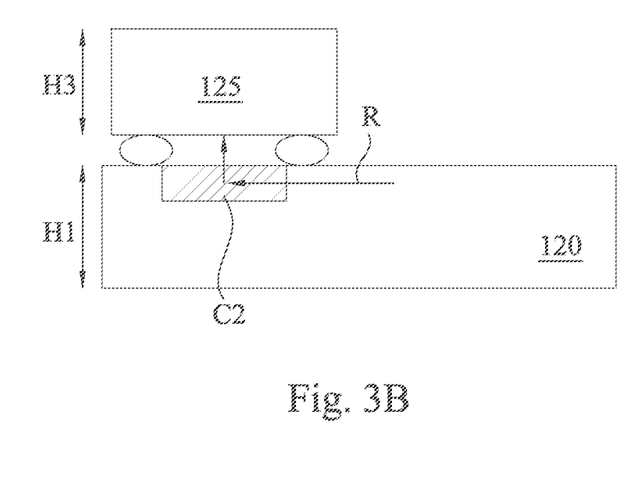

FIGS. 3A to 3B depict schematic diagrams of the photodetector 125 of the photonic integrated circuit 120 of the optical fiber network device 100 of FIG. 1 according to some embodiments of the present disclosure.

In some embodiments, please refer to FIG. 3A, the photodetector 125 is integrated in the photonic integrated circuit 120. The photodetector 125 is between a metal contact layer M and a waveguide WG. In some embodiments, a thickness H1 of the photonic integrated circuit 120 can be hundreds of micrometers ($\mu$m). This embodiment is about 700-800 micrometers ($\mu$m), and a thickness H2 of the photodetector 125 is about 1-10 micrometers ($\mu$m). The photodetector 125 is configured to receive the second optical signal R from the waveguide WG of the photonic integrated circuit 120. It should be noted that a thickness relationship between the thickness H1 of the photonic integrated circuit 120 and the thickness H2 of the photodetector 125 can be designed according to actual needs, and is not limited by this embodiment.

In some embodiments, please refer to FIG. 3B, the photodetector 125 is combined in the photonic integrated circuit 120. The photodetector 125 is configured to receive the second optical signal R through the coupler C2 of the photonic integrated circuit 120. In some embodiments, a thickness H1 of the photonic integrated circuit 120 can be hundreds of micrometers ($\mu$m). This embodiment is about 700-800 micrometers ($\mu$m), and a thickness H3 of the photodetector 125 is about 100-200 micrometers ($\mu$m). It should be noted that a thickness relationship between the thickness H1 of the photonic integrated circuit 120 and the thickness H3 of the photodetector 125 can be designed according to actual needs, and is not limited by this embodiment.

Compared with the embodiment in FIG. 3B, the embodiment in FIG. 3A is directly integrates the photodetector 125 in the photonic integrated circuit 120, so the size of the photonic integrated circuit 120 of FIG. 3A is smaller.

In some embodiments, the photodetector 125 includes one of metal and non-metal. In some embodiments, the photodetector 125 includes one of the chemical elements germanium, gallium, indium, and arsenic or a compound of the aforementioned elements.

Figure 4:
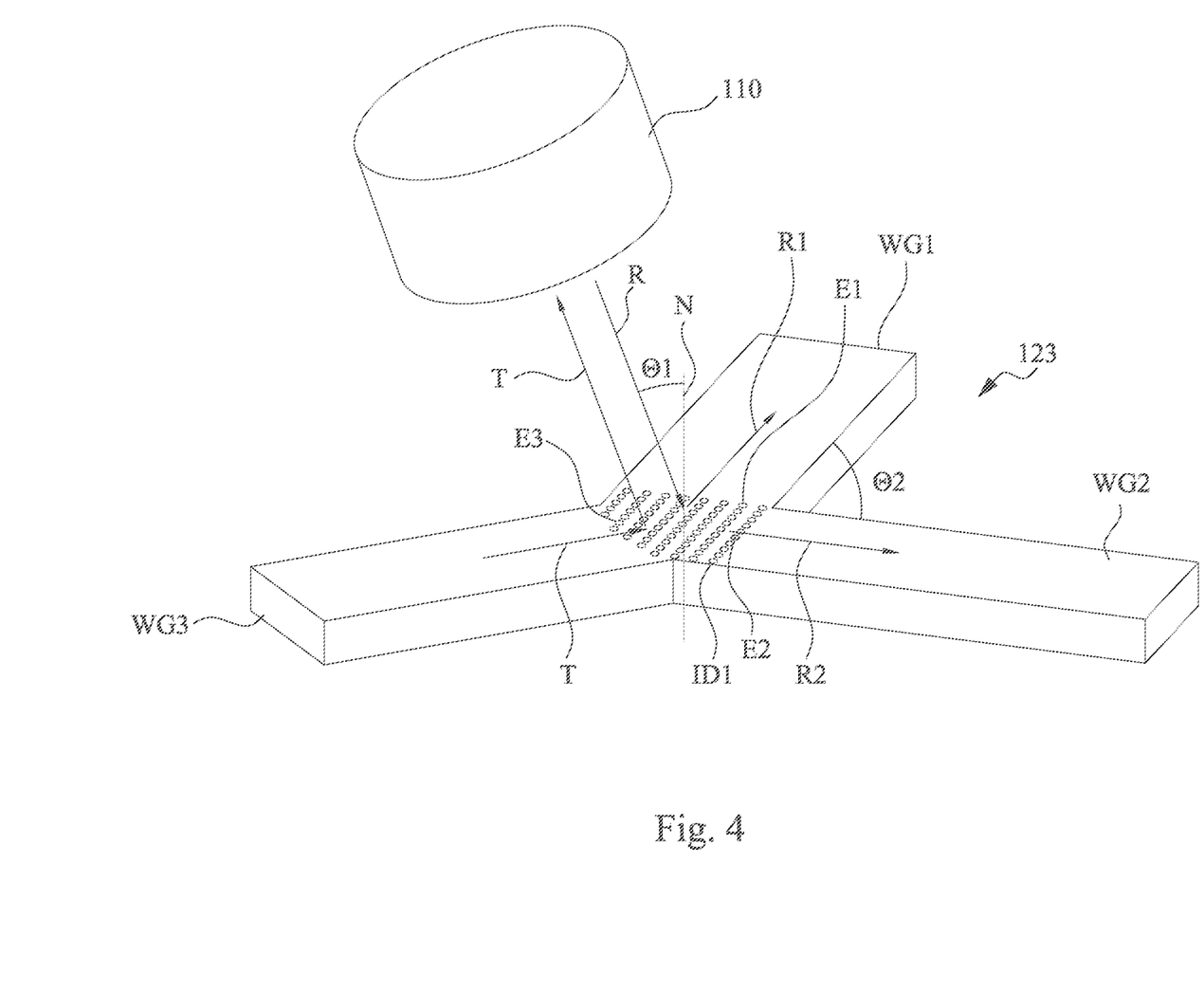
FIG. 4 depicts a schematic diagram of a fiber and a wavelength division multiplexing coupler of an optical fiber network device according to some embodiments of the present disclosure.

FIG. 4 depicts a schematic diagram of the fiber 110 and the wavelength division multiplexing coupler 123 of the optical fiber network device 100 according to some embodiments of the present disclosure. In some embodiments, please refer to FIG. 4, the wavelength division multiplexing coupler 123 includes an inverse design structure ID1, a first output waveguide channel WG1, a second output waveguide channel WG2 and a first input waveguide channel WG3. The inverse design structure ID1 includes a first terminal E1, a second terminal E2 and a third terminal E3. The first output waveguide channel WG1 is coupled to the first terminal E1 of the inverse design structure ID1. The second output waveguide channel WG2 is coupled to the second terminal E2 of the inverse design structure ID1. The first input waveguide channel WG3 is coupled the third terminal E3 of the inverse design structure ID1. The first terminal E1, the second terminal E2 and the third terminal E3 of the inverse design structure ID1 are not in contact with each other.

In some embodiments, the inverse design structure ID1 is configured to receive the second optical signal R from the fiber 110 according to the tilt angle Θ1, and split the second optical signal R into the first optical receiving signal R1 and the second optical receiving signal R2. The inverse design structure ID1 is configured to couple the first optical signal T from the plane where the photonic integrated circuit 120 is located to the transceiver port of the fiber 110 according to the tilt angle Θ1.

In some embodiments, an angle of the tilt angle Θ1 is between 0° to 20°. In another embodiments, an angle of the tilt angle Θ1 is between 4° to 15°.

In some embodiments, a wavelength range of a first wavelength of the first optical signal T is between 1260 nanometers (nm) to 1360 nanometers (nm). A wavelength range of a second wavelength of the second optical signal R is between 1480 nanometers (nm) to 1580 nanometers (nm).

In some embodiments, the inverse design structure ID1 is configured to diffract the first optical receiving signal R1 ta the first terminal E1 of the inverse design structure ID1. The inverse design structure ID1 is configured to diffract the second optical receiving signal R2 to the second terminal E2 of the inverse design structure ID1. The inverse design structure ID1 is configured to receive the first optical signal T from the third terminal E3 of the inverse design structure ID1.

In some embodiments, the first output waveguide channel WG1 is configured to output the first optical receiving signal R1. The second output waveguide channel WG2 is configured to output the second optical receiving signal R2. The first input waveguide channel WG3 is configured to receive the first optical signal T.

In some embodiments, a first intersection angle θ2 is formed between the first output waveguide channel WG1 and the second output waveguide channel WG2. In some embodiments, an angle range of the first intersection angle θ2 is between 80° to 110°.

Figure 5:
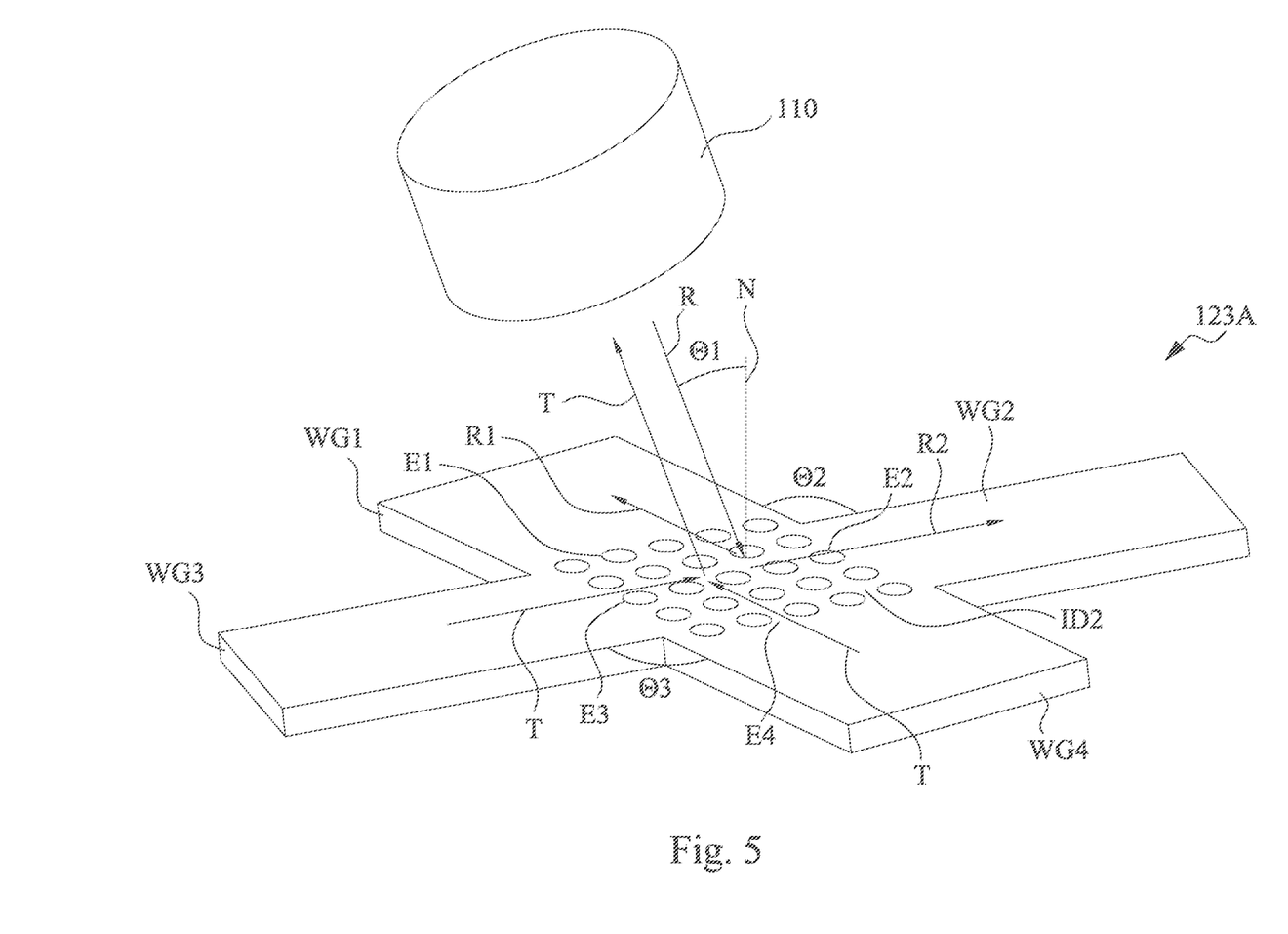
FIG. 5 depicts a schematic diagram of a fiber and a wavelength division multiplexing coupler of an optical fiber network device according to some embodiments of the present disclosure.

FIG. 5 depicts a schematic diagram of the fiber 110 and the wavelength division multiplexing coupler 123A of the optical fiber network device 100 according to some embodiments of the present disclosure. Compared with the wavelength division multiplexing coupler 123 in FIG. 4, the wavelength division multiplexing coupler 123A in FIG. 5 further includes a second input waveguide channel WG4, rests of structures are the same as the wavelength division multiplexing coupler 123, and detail repetitious are omitted here. Compared with the inverse design structure ID1 in FIG. 4, the inverse design structure ID2 in FIG. 5 further includes a fourth terminal E4, rests of structures are the same as the inverse design structure ID1, and detail repetitious are omitted here.

In some embodiments, a second intersection angle θ3 is formed between the first input waveguide channel WG3 and the second input waveguide channel WG4. In some embodiments, an angle range of the second intersection Θ3 is between 80° to 110°.

Figure 6A:
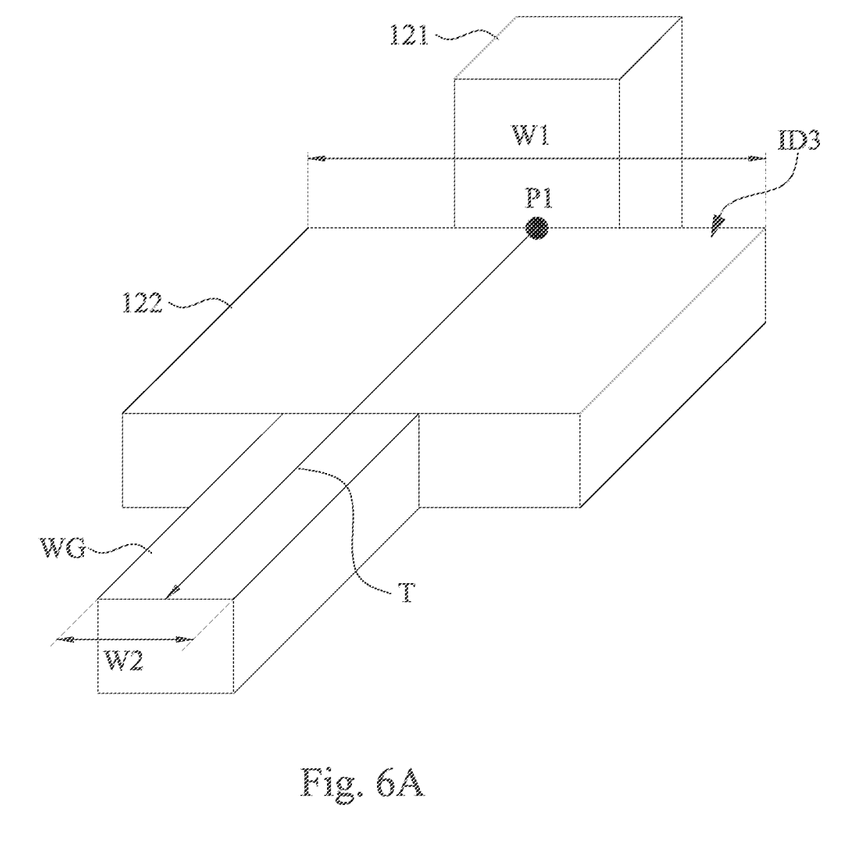
FIGS. 6A to 6B depict schematic diagrams of a transmission of an optical signal output from a laser chip in an optical fiber network device according to some embodiments of the present disclosure.

FIG. 6A depicts a schematic diagram of a transmission of the first optical signal T from the laser chip 121 in the optical fiber network device 100 according to some embodiments of the present disclosure. In some embodiments, the optical modulation element 122 is a laser spot size converter. The laser spot size converter is coupled to the wavelength division multiplexing coupler 123 through the waveguide WG of the photonic integrated circuit (not shown in the figure). The optical modulation element 122 includes an inverse design structure ID3. The inverse design structure ID3 is coupled to an output terminal (i.e. a position P1) of the laser chip 121 and the waveguide WG of the photonic integrated circuit (not shown in the figure), is configured to converge the first optical signal T, and is configured to convert a laser mode of the first optical signal T, so as to output the first optical signal to the waveguide WG of the photonic integrated circuit (not shown in the figure).

Figure 6B:
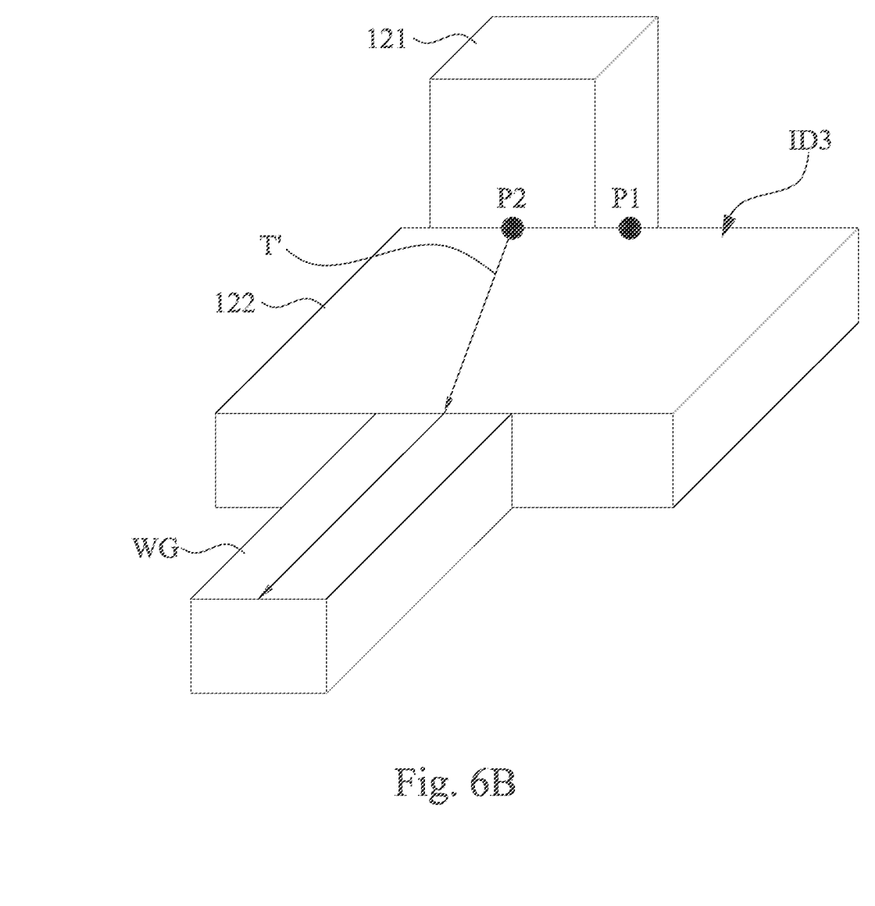

FIG. 6B depicts a schematic diagram of a transmission of an optical signal T' output from the laser chip 121 in the optical fiber network device 100 according to some embodiments of the present disclosure. Compared with the embodiment in FIG. 6A, a difference between the embodiment in FIG. 6A and the embodiment in FIG. 6B is that a position of the laser chip 121 is different, rests of structures and operations are the same as the embodiment in FIG. 6A, and detail repetitious are omitted here. It should be noted that the optical signal T' in FIG. 6B is the same as the first optical signal T in FIG. 6A.

An output terminal (i.e.: a position P2) of the laser chip 121 in FIG. 6B outputs the optical signal T', so as to converge the shifted the optical signal T' through the inverse design structure ID3, and convert a laser mode of the shifted the optical signal T', so as to output the shifted the optical signal T' to the waveguide WG of the photonic integrated circuit (not shown in the figure).

In some embodiments, a first width W1 of the inverse design structure ID3 is greater than a second width W2 of the waveguide WG of the photonic integrated circuit (not shown in the figure). For example, the first width W1 of the inverse design structure ID3 may be three time the second width W2 of the waveguide WG of the photonic integrated circuit (not shown in the figure). It should be noted that a multiple relationship between the first width W1 of the inverse design structure ID3 and the second width W2 of the waveguide WG of the photonic integrated circuit (not shown in the figure) can be designed according to actual needs, and is not limited by this embodiment.

Figure 7:
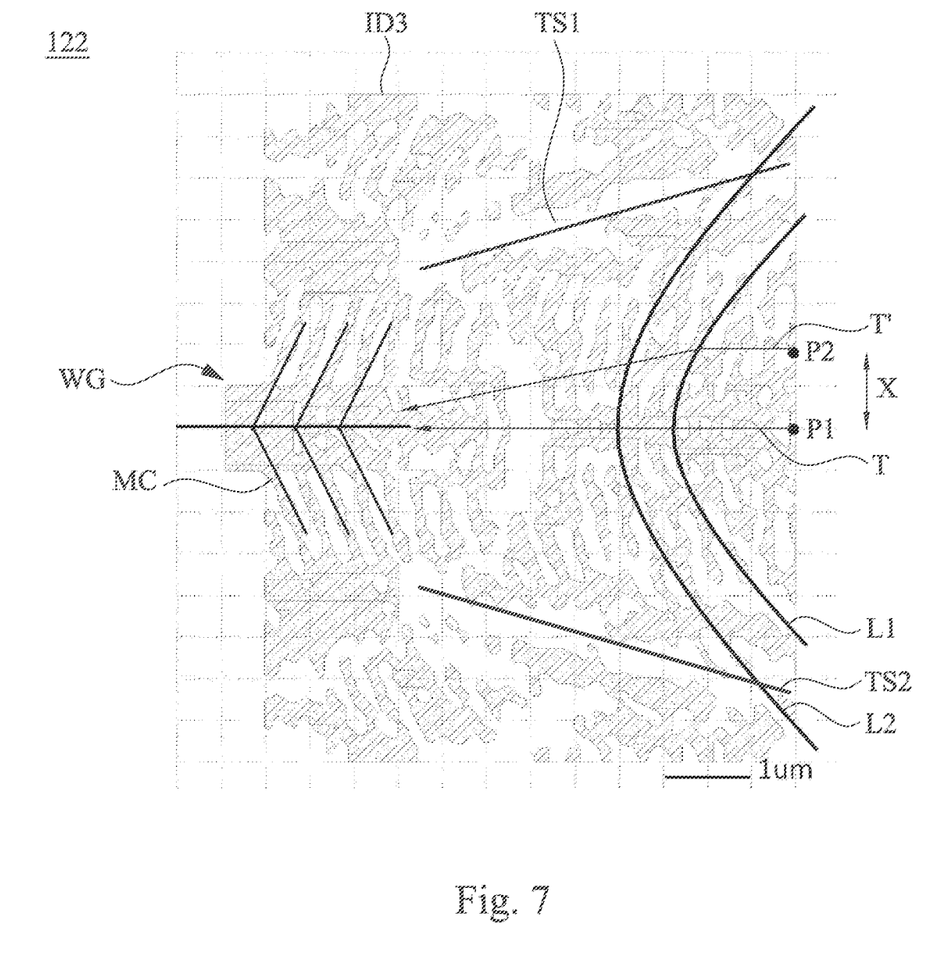
FIG. 7 depicts a schematic diagram of an inverse design structure of an optical modulation element according to some embodiments of the present disclosure.

FIG. 7 depicts a schematic top view diagram of the inverse design structure ID3 of the optical modulation element 122 shown in FIG. 6A or FIG. 6B. The inverse design structure ID3 includes a fish-bone mode transformation structure MC, at least one curved structure (e.g.: a curved structure L1 and a curved structure L2) and at least one trench structure (e.g.: a trench structure TS1 and a trench structure TS2). The fish-bone mode transformation structure MC is coupled to the wavelength division multiplexing coupler 123. The at least one curved structure (e.g.: the curved structure L1 and the curved structure L2) is coupled the fish-bone mode transformation structure MC and the output terminal of the laser chip 121 (i.e. the position P1 or the position P2). The at least one trench structure (e.g.: the trench structure TS1 and the trench structure TS2) is coupled to the at least one curved structure (e.g.: the curved structure L1 and the curved structure L2).

In some embodiments, the fish-bone mode transformation structure MC is configured to convert the laser mode of the first optical signal T or the optical signal T'.

In some embodiments, the at least one curved structure (e.g.: the curved structure L1 and the curved structure L2) is arranged according to curves in the figure, and is configured to converge the first optical signal T or the optical signal T' to the fish-bone mode transformation structure MC. X is a lateral displacement of a laser beam emitted by the laser chip 121, that is, a distance between the position P1 and the position P2.

In some embodiments, the at least one trench structure (e.g.: the trench structure TS1 and the trench structure TS2) is configured to prevent the first optical signal T or the optical signal T' from leaking out of the inverse design structure ID3.

It should be noted that, please refer to FIG. 6A to FIG. 7, in practice, the laser chip 121 needs to be precisely aligned to the position P1, and is combined with the optical modulation element 122, so that the first optical signal T output by the laser chip 121 is precisely aligned with the waveguide WG of the photonic integrated circuit (not shown in the figure) for incident.

It is further explained that through the inverse design structure ID3 of the present disclosure, the shifted optical signal T' can be gathered so that the shifted optical signal T' can be injected into the waveguide WG of the photonic integrated circuit (not shown in the figure). Therefore, the optical fiber network device 100 of the present disclosure can allow the position of the laser beam (i.e. the optical signal T') output by the laser chip 121 to be slightly shifted, thereby reducing a cost and time of an alignment process of the optical fiber network device 100.

Figure 8:
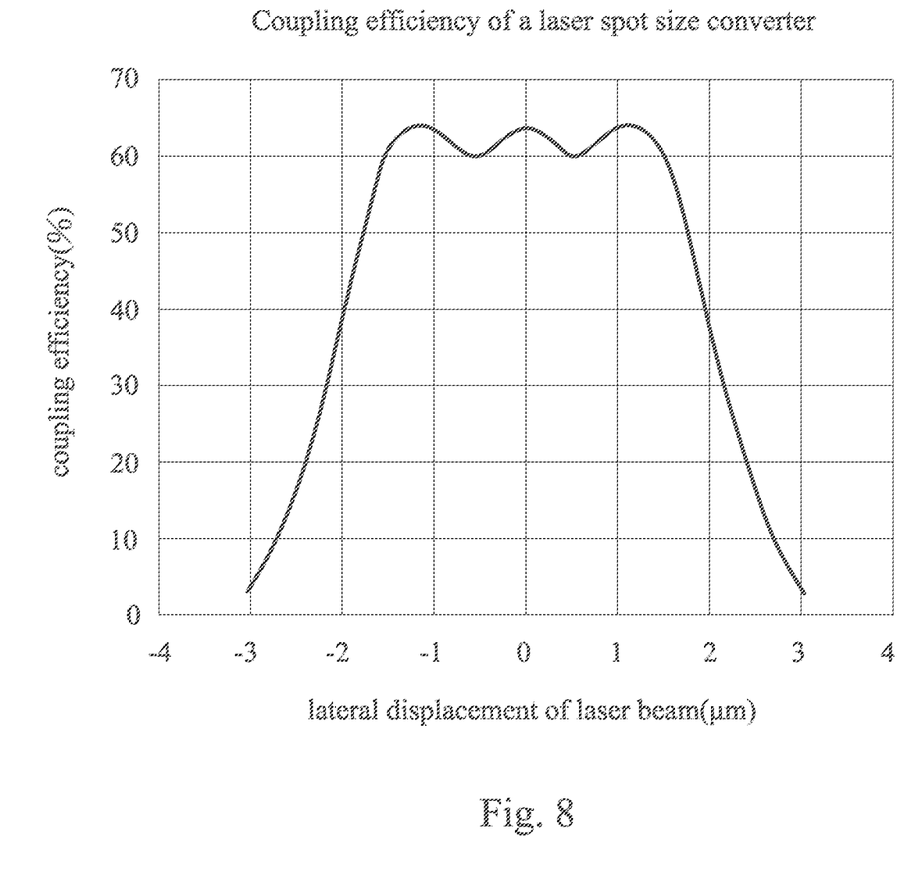
FIG. 8 depicts a schematic diagram of a coupling efficiency of an inverse design structure of an optical modulation element according to some embodiments of the present disclosure.

FIG. 8 depicts a schematic diagram of a coupling efficiency of the inverse design structure ID3 of the optical modulation element 122 according to some embodiments of the present disclosure. Please refer to FIG. 6A and FIG. 8, an allowable range of the lateral displacement X of a laser beam output from the position P1 by the laser chip 121 is ±2 micrometers (μm). In other words, a distance between a coupling efficiency of the laser spot size converter (i.e.: laser power) and a full width at half maximum (FWHM) is 2 micrometers (μm). At this time, the coupling efficiency of the laser spot size converter is about 40%.

Figure 9:
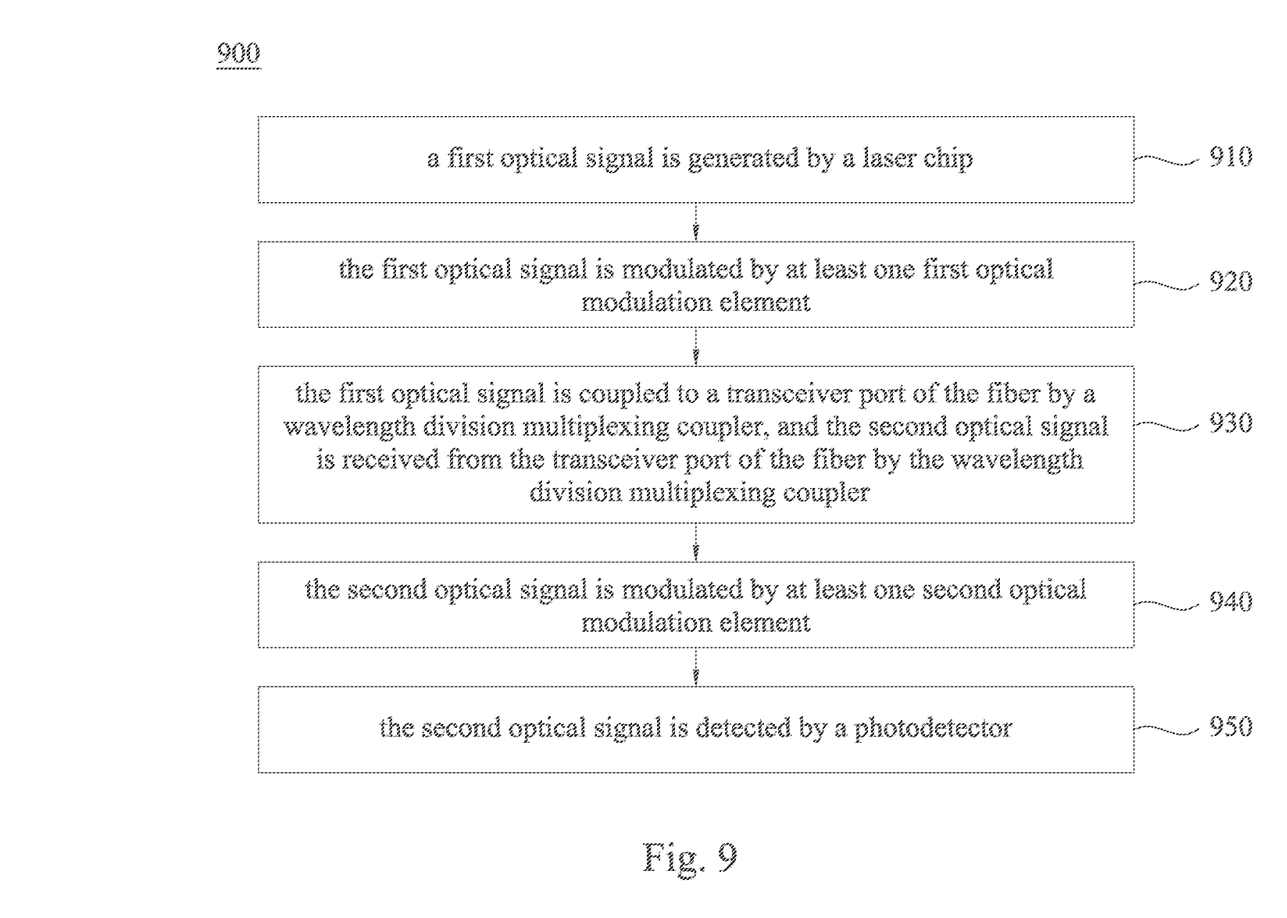
FIG. 9 depicts a flow chart of an optical fiber optic signal transmission method according to some embodiments of the present disclosure.

FIG. 9 depicts a flow chart of an optical fiber optic signal transmission method 900 according to some embodiments of the present disclosure. In some embodiments, the optical fiber optic signal transmission method 900 can be implemented by the optical fiber network device 100 in FIG. 1. The optical fiber optic signal transmission method 900 includes step 910 to step 950. Steps 910 to 950 will be described in following paragraph.

In step 910, please refer to FIG. 1 and FIG. 9, a first optical signal T is generated by the laser chip 121.

In step 920, the first optical signal T is modulated by at least one first optical modulation element 122.

In step 930, the first optical signal T is coupled to the transceiver port of the fiber 110 by the wavelength division multiplexing coupler 123, and the second optical signal R is received from the transceiver port of the fiber 110 by the wavelength division multiplexing coupler 123.

In step 940, the second optical signal R is modulated by at least one second optical modulation element 124.

In step 950, the second optical signal R is detected by the photodetector 125.

Based on the aforementioned embodiments, the present disclosure provides an optical fiber network device. Through a design of an optical fiber network device of the present disclosure, a manufacturing cost of an optical fiber network device can be reduced, and a coupling efficiency of an optical signal transmitted by an optical fiber network device can be improved. In addition, with an inverse design structure of an optical modulation element of an optical fiber network device of the present disclosure, an optical fiber network device of the present disclosure can allow a position of a laser beam output by a laser chip to be slightly shifted, thereby reducing a cost and time of an alignment process of an optical fiber network device.

Certain terms are used in the specification and the claims to refer to specific components. However, those of ordinary skill in the art would understand that the same components may be referred to by different terms. The specification and claims do not use the differences in terms as a way to distinguish components, but the differences in functions of the components are used as a basis for distinguishing. Furthermore, it should be understood that the term "comprising" used in the specification and claims is open-ended, that is, including but not limited to. In addition, "coupling" herein includes any direct and indirect connection means. Therefore, if it is described that the first component is coupled to the second component, it means that the first component can be directly connected to the second component through electrical connection or signal connections including wireless transmission, optical transmission, and the like, or the first component is indirectly electrically or signally connected to the second component through other component(s) or connection means.

It will be understood that, in the description herein and throughout the claims that follow, the phrase "and/or" includes any and all combinations of one or more of the associated listed items. Unless the context clearly dictates otherwise, the singular terms used herein include plural referents.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:
1. An optical fiber network device, comprise:

a fiber, configured to receive a first optical signal and transmit a second optical signal, wherein a first wavelength of the first optical signal is different from a second wavelength of the second optical signal; and a photonic integrated circuit, configured to transmit the first optical signal and receive the second optical signal, wherein the photonic integrated circuit comprises:

a laser chip, disposed on the photonic integrated circuit, and configured to generate the first optical signal;

a photodetector, configured to detect the second optical signal;

a wavelength division multiplexing coupler, configured to couple the first optical signal to a transceiver port of the fiber, and receive the second optical signal from the transceiver port of the fiber, wherein the wavelength division multiplexing coupler comprises an inverse design structure configured to couple the first optical signal from a plane where the photonic integrated circuit is located to the transceiver port of the fiber according to a tilt angle;

at least one first optical modulation element, coupled to the wavelength division multiplexing coupler and the laser chip, and configured to modulate the first optical signal; and at least one second optical modulation element, coupled to the wavelength division multiplexing coupler and the photodetector, and configured to modulate the second optical signal.

2. The optical fiber network device of claim 1, wherein the laser chip is configured to combine or integrate on the photonic integrated circuit.

3. The optical fiber network device of claim 1, wherein the laser chip comprises one of an edge-emitting laser chip and a surface-emitting laser chip.

4. The optical fiber network device of claim 1, wherein the photodetector is configured to combine or integrate on the photonic integrated circuit.

5. The optical fiber network device of claim 1, wherein the photodetector comprises one of a germanium, a gallium, an indium, and an arsenic or any combination of the above.

6. The optical fiber network device of claim 1, wherein the inverse design structure is configured to receive the second optical signal from the transceiver port of the fiber according to the tilt angle, and is configured to split the second optical signal into a first optical receiving signal and a second optical receiving signal.

7. The optical fiber network device of claim 6, wherein the inverse design structure comprises a first terminal, a second terminal and a third terminal, wherein the inverse design structure is configured to diffract the first optical receiving signal to the first terminal of the inverse design structure, wherein the inverse design structure is configured to diffract the second optical receiving signal to the second terminal of the inverse design structure, wherein the inverse design structure is configured to receive the first optical signal from the third terminal of the inverse design structure.

8. The optical fiber network device of claim 7, wherein the wavelength division multiplexing coupler further comprises:

a first output waveguide channel, coupled to the first terminal of the inverse design structure, and configured to output the first optical receiving signal;

a second output waveguide channel, coupled to the second terminal of the inverse design structure, and configured to output the second optical receiving signal; and a first input waveguide channel, coupled to the third terminal of the inverse design structure, and configured to the first optical signal.

9. The optical fiber network device of claim 8, wherein the inverse design structure further comprises a fourth terminal, wherein the wavelength division multiplexing coupler further comprises:

a second input waveguide channel, coupled to the fourth terminal of the inverse design structure, and configured to receive the first optical signal.

10. The optical fiber network device of claim 9, wherein a first intersection angle is formed between the first output waveguide channel and the second output waveguide channel, wherein a second intersection angle is formed between the first input waveguide channel and the second input waveguide channel, wherein an angle range of each of the first intersection angle and the second intersection angle is between 80° to 110°.

11. The optical fiber network device of claim 1, wherein the at least one first optical modulation element comprises one of a spot size converter, a filter, a taper, a splitter, a modulator and a combiner, wherein the at least one second optical modulation element comprises one of a spot size converter, a filter, a taper, a splitter, a modulator and a combiner.

12. The optical fiber network device of claim 1, wherein the at least one first optical modulation element comprises a laser spot size converter, where the laser spot size converter is coupled to the wavelength division multiplexing coupler through a waveguide of the photonic integrated circuit, wherein the laser spot size converter comprises an inverse design structure, wherein the inverse design structure of the laser spot size converter is coupled to the wavelength division multiplexing coupler and an output terminal of the laser chip, and is configured to converge the first optical signal and convert a laser mode of the first optical signal, so as to output the first optical signal to the wavelength division multiplexing coupler.

13. The optical fiber network device of claim 12, wherein the inverse design structure of the laser spot size converter comprises:

a fish-bone mode transformation structure, coupled to the wavelength division multiplexing coupler, and configured to convert the laser mode of the first optical signal.

14. The optical fiber network device of claim 13, wherein the inverse design structure of the laser spot size converter further comprises:

at least one curved structure, coupled to the fish-bone mode transformation structure and the output terminal of the laser chip, and configured to converge the first optical signal to the fish-bone mode transformation structure.

15. The optical fiber network device of claim 14, wherein the inverse design structure of the laser spot size converter further comprises:

at least one trench structure, coupled to the at least one curved structure, and configured to prevent the first optical signal from leaking out of the inverse design structure of the laser spot size converter.

16. The optical fiber network device of claim 12, wherein a first width of the inverse design structure of the laser spot size converter is greater than a second width of the waveguide of the photonic integrated circuit.

17. An optical fiber optic signal transmission method, adapted to an optical fiber network device, wherein the optical fiber network device comprises a fiber and a photonic integrated circuit, wherein the photonic integrated circuit comprises a laser chip, a photodetector, a wavelength division multiplexing coupler, at least one first optical modulation element and at least one second optical modulation element, wherein the at least one first optical modulation element comprises a laser spot size converter comprising an inverse design structure that is coupled to the wavelength division multiplexing coupler and the laser chip, wherein the at least one second optical modulation element is coupled to the wavelength division multiplexing coupler and the photodetector, wherein the optical fiber optic signal transmission method comprises:

generating a first optical signal by the laser chip;

modulating the first optical signal by the at least one first optical modulation element;

coupling the first optical signal to a transceiver port of the fiber by the wavelength division multiplexing coupler, and receiving a second optical signal from the transceiver port of the fiber by the wavelength division multiplexing coupler, wherein a first wavelength of the first optical signal is different from a second wavelength of the second optical signal;

modulating the second optical signal by the at least one second optical modulation element; and detecting the second optical signal by the photodetector.

18. The optical fiber optic signal transmission method of claim 17, wherein the at least one first optical modulation element comprises one of a spot size converter, a filter, a taper, a splitter, a modulator and a combiner, wherein the at least one second optical modulation element comprises one of a spot size converter, a filter, a taper, a splitter, a modulator and a combiner.

19. The optical fiber optic signal transmission method of claim 17, wherein the laser spot size converter is coupled to the wavelength division multiplexing coupler through a waveguide of the photonic integrated circuit, and the inverse design structure is configured to converge the first optical signal and convert a laser mode of the first optical signal, so as to output the first optical signal to the wavelength division multiplexing coupler.

20. The optical fiber optic signal transmission method of claim 19, wherein a first width of the inverse design structure is greater than a second width of the waveguide of the photonic integrated circuit.

* * * * *